J. W. HARSLEY AND M. P. APGAR.
COMBINATION SPRING COMPRESSOR AND SPRING CLAMP.
APPLICATION FILED JULY 2, 1920.
1,389,657. Patented Sept. 6, 1921.
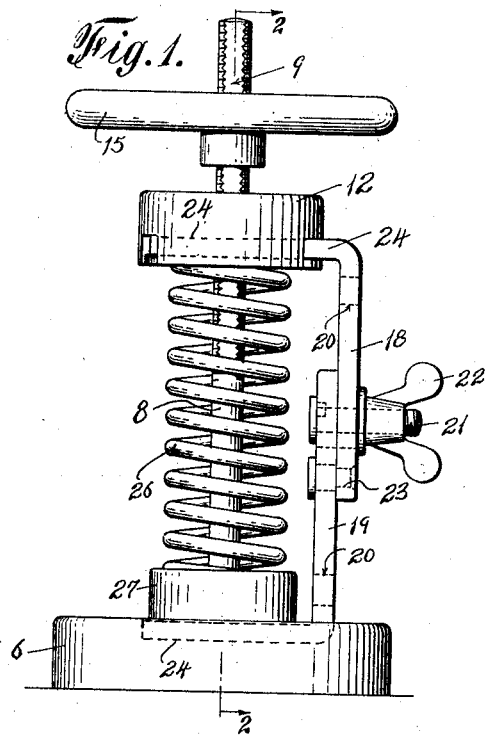
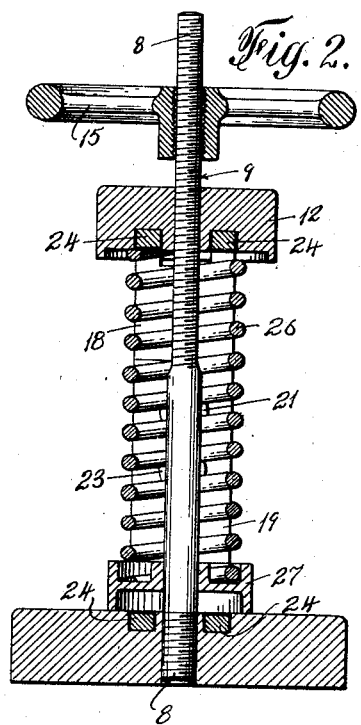
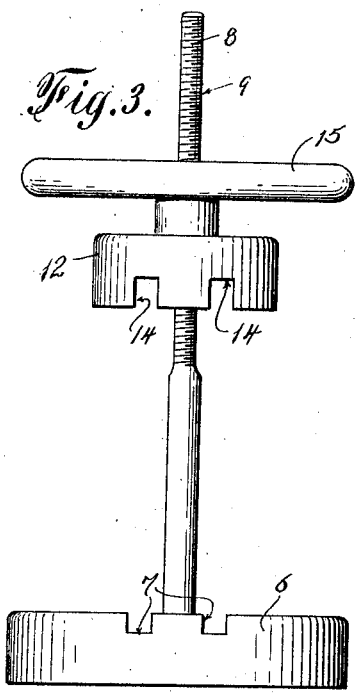
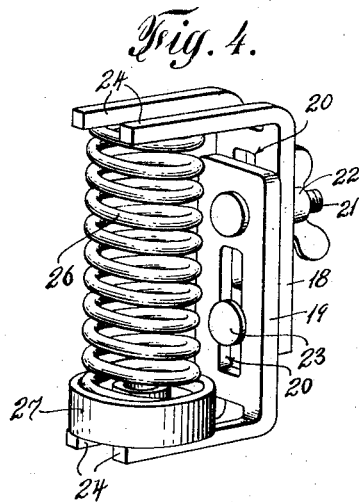
Inventor
John W Harsley
Milton P. Apgar
By
James C. Ledbetter  Attorney

UNITED STATES PATENT OFFICE.

JOHN W. HARSLEY AND MILTON P. APGAR, OF NEW YORK, N. Y.

COMBINATION SPRING-COMPRESSOR AND SPRING-CLAMP.

1,389,657.   Specification of Letters Patent.   Patented Sept. 6, 1921.

Application filed July 2, 1920. Serial No. 393,479.

*To all whom it may concern:*

Be it known that we, JOHN W. HARSLEY and MILTON P. APGAR, citizens of the United States, residing at New York, in the borough of Manhattan, in the county of New York and State of New York, have invented certain new and useful Improvements in Combination Spring-Compressors and Spring-Clamps, of which the following is a specification.

This invention relates to spring compressors or spring holding tools for use in connection with the assembling of puppet type valves in internal combustion motors. More particularly the invention relates to a combination spring compressor and spring clamp.

The primary object of this invention is to produce a device of simple, rugged construction which is efficient in operation in compressing a stiff valve spring, which may be used to conveniently insert the compressed spring into position upon the engine and in connection with the engine valve so as to avoid the danger and awkward inconvenience heretofore experienced in placing valve springs on the motor.

Reference is had to the accompanying drawings forming part of this disclosure, wherein:

Figure 1 illustrates the combination spring compressor and spring clamp in side elevation; and Fig. 2 shows the tool in section as taken on the line 2—2 of Fig. 1. In these two views the valve spring to be compressed is shown mounted in position but not under compression.

Fig. 3 illustrates the spring stand or the spring compressing part of the tool shown separate from the clamp and spring.

Fig. 4 shows a perspective view of the clamp holding a valve spring in compressed position ready to be placed on an engine.

A combination spring compressor and spring clamp tool built in accordance with the plans of this invention comprises a stand for holding a spring and having means to compress the spring. A clamp is associated with the stand and acts to hold the spring in compression after the spring has been acted upon by the compressing means. The clamp, holding the spring in compressed position, is easily removable from the stand for the purpose of placing the spring in position on engine.

In presenting a more detailed disclosure of the invention, further reference is had to the drawings wherein a base 6 has a number of grooves or channels 7 formed in the upper face thereof. A stem 8 is anchored in the base and threaded on the other end. The threaded portion of the stem 8 is preferably finished off on the opposite sides to form opposite plane thread interrupted surfaces 9.

A spring cap 12 is loosely confined on the threaded portion of the stem and adapted to slide freely up and down thereon and over the threads of the stem. This spring cap is restrained against rotation on the stem due to its sliding fit on the plane surfaces 9 of the stem. This spring cap likewise has grooves 14 made therein similar to the grooves 7 of the base, and preferably equal in spacing and dimensional arrangement with the grooves 7 of the base. A hand-wheel 15 is screwed on the threaded stem 8 and acts against the spring cap 12 to drive the cap downwardly against the spring confined on the stem 8 between the base and the cap. This completes the construction of the spring stand shown in Fig. 3.

A spring clamp is made of two slidably adjustable parts 18 and 19. A slot 20 is formed in each clamp part, and a pressure screw 21 is firmly anchored in one part 19 and movably confined in the slot 20 of the other part 18. A thumb nut 22 is threaded upon the pressure screw 21 to bind against one clamp part 18, firmly setting the two parts 18 and 19 together in frictional engagement to prevent relative movement therebetween. A stud 23 is anchored in one clamp part and slidably confined in slot 20 of the other part so as to guide the two clamp pieces during relative motion or adjustment thereof.

The outer ends of the clamp pieces are made in the form of jaws comprising the parallel bars 24. The jaws 24 of the clamp range parallel each to each, and likewise the bars 24 of each jaw are made parallel one to the other, so that the jaw parts 24 will slip easily into position within the grooves 7 and 14 of the base 6 and cap 12 of the spring stand. The clamp may be inserted in the stand after the spring is compressed, since the grooves 7 and 14 are deep enough to allow free inward and outward movement of the jaws 24.

In using the tool, a spring 26 to be compressed is set on the base 6 over the stem 8.

Usually the spring 26 is fitted with a washer 27 and this washer rests directly on the base 6 over the grooves 7. The spring clamp 18—19 is loosened up so that its parts are slidable one on the other and is thrust in position upon the spring stand by registering the clamp jaw bars 24 in the grooves 7 and 14 of the stand. This places the jaws 24 over each end of the spring 26.

Next, the hand-wheel 15 is rotated which drives the spring cap 12 downwardly to compress the spring, thus causing the spring clamp to close or shorten itself. The engagement or registry of the clamp jaw bars 24 within the grooves 17 and 14 of the spring stand prevents the rotation of the spring cap 12 and other parts, and thus holds all parts in steady position while the hand-wheel is being turned to drive the spring downwardly into compressed position. When the spring is sufficiently compressed by screwing the hand-wheel down along the threaded stem 8, the thumb nut 22 is tightened up to firmly anchor together the clamp parts 18 and 19. The hand-wheel and cap may now be removed from the stand, whereupon the compressed spring is confined in the clamp as shown in Fig. 4.

The clamp, together with the spring, may now be removed from the stand and quite easily mounted in working position on the engine. The mechanic performing this operation holds the clamp at the body portion 18 and 19 and when the spring is in position the nut 22 is slowly loosened to permit the spring to expand and slowly move into anchored position on the engine.

Having thus described the construction, purpose and operation of the tool comprising our invention, what we claim and desire to secure by Letters Patent is:

1. A combination spring compressor and spring clamp, comprising a stand to hold a spring with grooves made in the stand, a spring compressing device used in conjunction with the stand to force the spring into compression, and an adjustable clamp to slip into the grooves capable of fitting over the ends of a spring to hold said spring under compression.

2. A tool for handling springs, comprising a stand, a device to force the spring into compression on the stand, said stand having a groove made therein at each end of the spring, a clamp having jaws which are slidable into the grooves under the spring ends to grasp the spring and hold it under compression.

3. A spring handling tool comprising a base to support the tool in upright position, a stem fixed to the base and threaded on the upper end and the threaded part having oppositely finished flat surfaces, a spring cap confined on the stem and held against rotation by virtue of the aforesaid flat surfaces, and a means to force the spring cap downwardly against a spring confined on the stem.

4. A spring handling tool as defined in claim 3 wherein the base and spring cap are grooved to admit another tool such as a clamp to hold the spring in compressed position.

5. A spring handling tool comprising a base, a stem fixed to the base to receive a spring to be compressed, a device related with the stem to compress the spring, said tool and base having a groove made therein under the end of the spring on the stem for the reception of a tool to hold the spring under compression and make possible the removal of the compressed spring from the base.

Witness our hands this 29th day of June, 1920.

JOHN W. HARSLEY.
MILTON P. APGAR.